May 20, 1952  T. W. DRURY ET AL  2,597,078
DIRECTIONAL SIGNAL SWITCH
Filed Sept. 3, 1948  2 SHEETS—SHEET 1
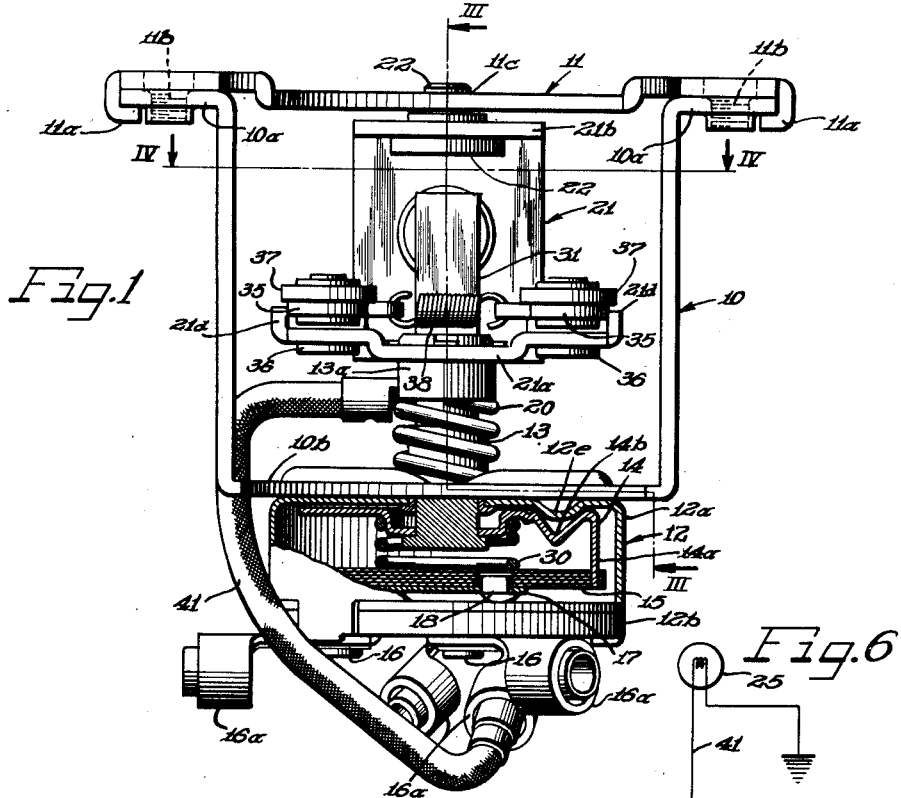
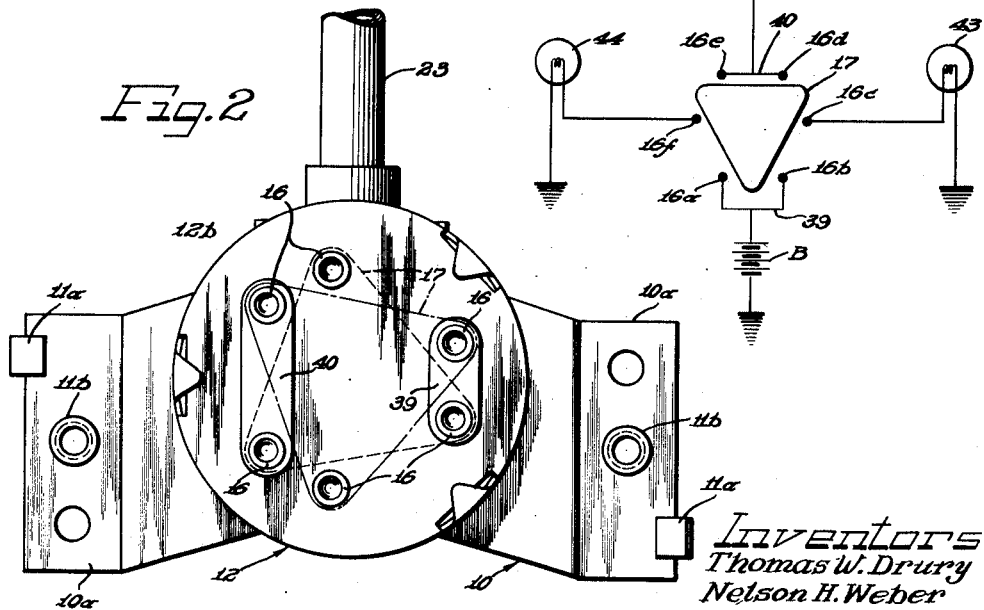
Inventors
Thomas W. Drury
Nelson H. Weber
Eugene F. Loro

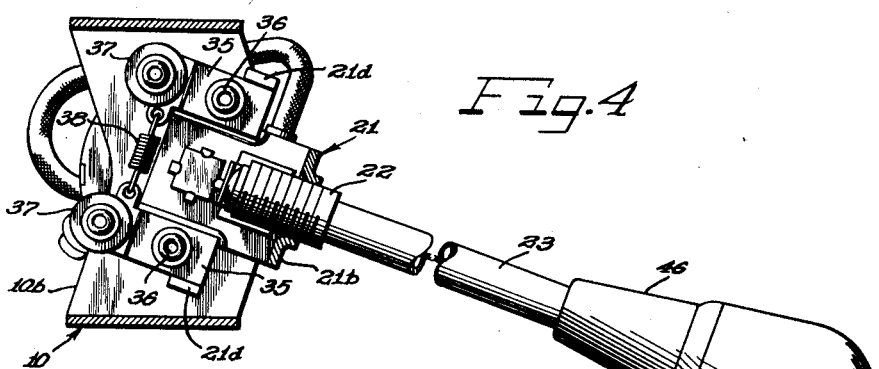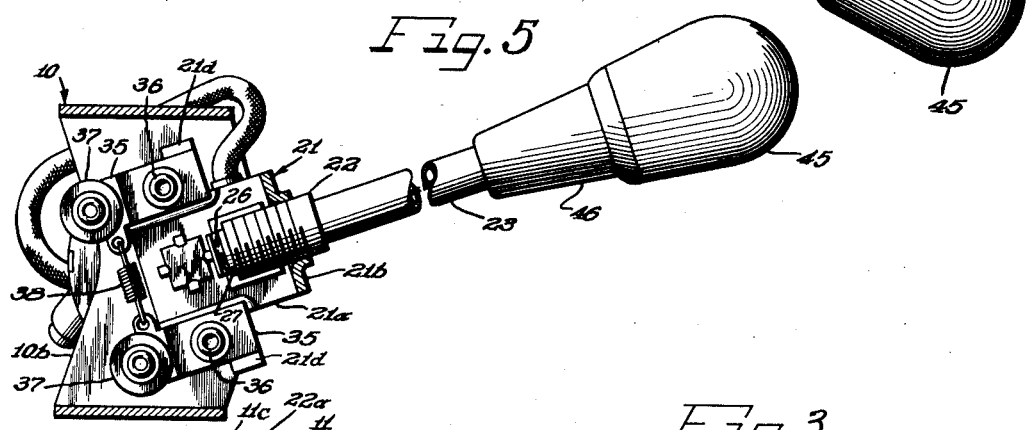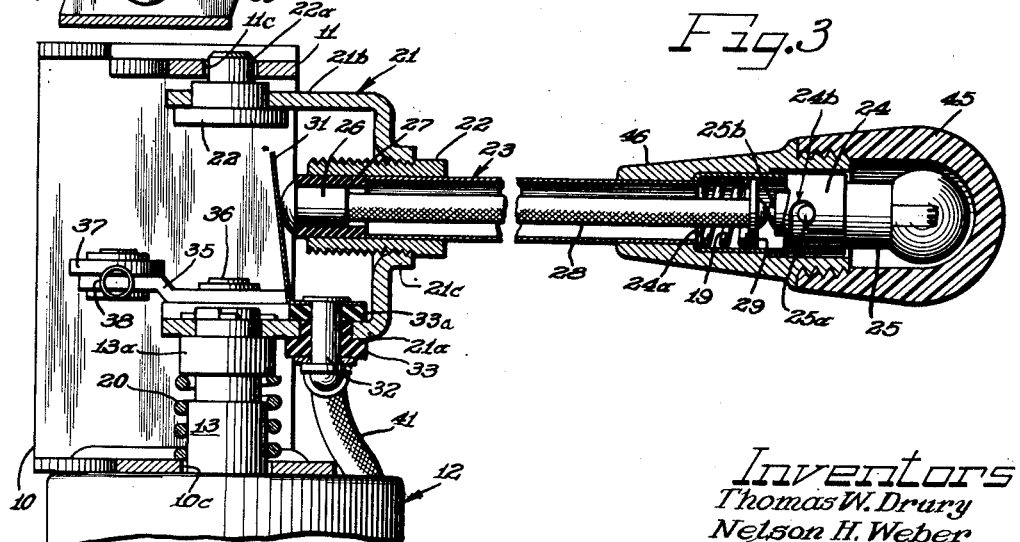

Patented May 20, 1952

2,597,078

UNITED STATES PATENT OFFICE 2,597,078

DIRECTIONAL SIGNAL SWITCH

Thomas W. Drury, Sturgis, Nelson H. Weber, Bronson, and Eugene F. Loro, Sturgis, Mich., assignors, by mesne assignments, to Kingston Products Corporation, Kokomo, Ind., a corporation of Indiana Application September 3, 1948, Serial No. 47,734

6 Claims. (Cl. 200—59)

This invention relates to a turn-indicating signalling system for an automotive vehicle, and particularly to an improved construction of an actuating mechanism for the electric switch of such system.

In recent years, turn-indicating signalling systems have been adopted as standard equipment for most automotive vehicles. As is well known, such systems generally include at least a pair of lights which are exteriorly mounted on the vehicle and which are selectively energized by the operator's manipulation of a control switch to indicate a desired direction of turn which the operator expects to accomplish. Such known turn-indicating systems have also incorporated various forms of steering shaft actuated reset mechanisms which will restore the electric switch to a neutral position by the return movement of the steering wheel to its neutral position following the completion of the indicated turn. Such known constructions have not been entirely satisfactory inasmuch as the electric switch unit and the operating mechanism therefor has been unusually complicated and difficult and expensive to manufacture. Also, elaborate arrangements of pilot lights have been employed to indicate the setting of the system to the operator.

Accordingly, it is an object of this invention to provide an improved turn-indicating signalling system for automotive vehicles or the like, and particularly an improved turn-indicating switch for use in such systems.

A particular object of this invention is to provide an unusually simplified arrangement for indicating the operating condition of a turn-indicating switch characterized by the mounting of an indicating light directly upon the switch operating handle, and the selective energization of such light as the switch is shifted from its neutral to either one of its turn-indicating positions to indicate to the operator the condition of the turn-indicating system.

Still another object of this invention is to provide an economically manufacturable turn-indicating switch construction which will permit an electric switch element of standard construction to be associated with an actuating linkage for accomplishing the manual shifting of such electric switch element to either of its turn-indicating positions, and the automatic resetting of such electric switch element to a neutral position by the movement of the steering wheel of the vehicle following the completion of the indicated turn.

The specific nature of the invention, as well as other objects and advantages thereof, will become apparent to those skilled in the art from the following detailed description of the annexed sheets of drawings which, by way of preferred example only, illustrate one embodiment of this invention.

As shown on the drawings:

Figure 1 is a side elevational view, partly in section, of an assembled control switch mechanism for a vehicle turn-indicating system according to this invention;

Figure 2 is a bottom elevational view of the mechanism in Figure 1, with the wire connections eliminated for simplicity, and illustrating, in dotted lines, the cooperation of the rotatable switch plate with the fixed contact rivets;

Figure 3 is a sectional view taken on the plane III—III of Figure 1;

Figure 4 is a reduced scale sectional view taken on the plane IV—IV of Figure 1 and illustrating the position of the reset mechanism when the operating handle of the switch is shifted to one of its turn-indicating positions;

Figure 5 is a view similar to Figure 4, but illustrating the position of the reset mechanism when the operating handle is shifted to the other of its turn-indicating positions; and Figure 6 is a schematic circuit diagram of a vehicle turn-indicating signalling system incorporating a control switch embodying this invention.

As shown on the drawings:

As is well known, it is desirable that the control mechanism of a vehicle turn-indicating signalling system be mounted in proximity to the steering shaft of the vehicle not only from the standpoint of ease of access for the vehicle operator but also to permit the convenient cooperation of the steering shaft, or a member carried thereby, with the resetting mechanism of the switch to restore the signalling system to its neutral condition at the completion of any particular indicated turn.

Accordingly, the numeral 10 on the drawings represents a stamped metal frame which is of generally U-shaped configuration and has outturned mounting ear portions 10a. A cover plate 11 is provided for the open end of the frame 10 and such plate has down-turned and bent-over ear portions 11a which respectively cooperate with the ear portions 10a of the frame 10 to effect the rigid securement of the cover to the frame. Internally threaded apertures 11b, punched from ears 10a, permit the convenient bolt mounting of the frame 10 on the vehicle in the vicinity of the steering shaft (not shown).

The bottom wall 10b of the frame is thus disposed in spaced relationship with respect to the cover 11 and a pair of bearing apertures 10c and 11c are respectively provided in co-axial alignment in the aforementioned spaced wall surfaces of the frame structure.

An electric switch unit 12 is then mounted to the frame 10 as by having its stationary casing portions 12a rigidly secured to the outer face of the bottom wall 10b of the frame 10 in any convenient manner. Switch unit 12 may constitute any well known form of contact making device having a neutral or open contact position and two active or closed contact positions which are respectively produced by oppositely directed angular displacements of an operating shaft 13 of the switch from a neutral position.

The operating shaft 13 projects through the one bearing aperture 10c and thus lies within the interior of the frame 10. It should be particularly noted that so long as the electric switch element 12 is capable of effecting the desired circuit connections, no special construction of this contact making mechanism is required to adapt such to this application, and hence well known and commercially available switch units may be employed.

For example, the electric switch unit 12 may comprise an inverted cup-shaped casing 12a which has its open end closed by a disk or plate 12b of insulating material. Closure disk 12b carries a plurality of electrically conducting contact pins or rivets 16 which are preferably circumferentially spaced adjacent the periphery of the insulating closure disk 12b. Conventional connector elements 16a are secured to each of the contact rivets 16 to permit the convenient connection of the switch contacts 16 into the electrical circuit.

An actuating plate 14 is co-rotatably secured to that portion of the operating shaft 13 which projects into the interior of switch casing 12a, and such actuating plate has an integral axially-extending projection 14a formed thereon which effects the co-rotation of a laminated insulated contact support disk 15. Contact support disk 15 is urged into engagement with the insulated closure disk 12b by a central spring 30. A metallic movable contact plate 17 of generally triangular configuration is secured to the face of the contact support disk 15 in any convenient manner, such as by contact embosses 18, which are respectively located adjacent the vertices of the triangular contact plate 17. The spacing of the movable embosses 18 with respect to the fixed contact rivets 16 is such that in at least one angular position of the operating shaft 13, the triangular contact plate 17 will be out of engagement with all of the fixed contact rivets 16, while an angular shifting of the operating shaft 13 in either direction from such neutral position will effect the simultaneous engagement of the movable contact plate 17 with at least two sets of fixed contact rivets 16 of the closure disk 12b. The specific circuit connections which are thus effected in a vehicle turn-indicating system by manipulation of the operating shaft 13 will be described in more detail later.

To resiliently latch the operating shaft 13 in any selected one of its three angular positions and then to latch the contact plate 17 in its neutral or either one of its two operating positions, the top wall of the casing 12a is provided with an integrally formed detent portion 12e which selectively engages one of a plurality of angularly spaced depressions or notches 14b formed in the actuator plate 14.

As previously mentioned, the exposed end of the operating shaft 13 projects into the interior of the hollow frame 10 and the end of such projecting portion may be provided with an enlarged head portion 13a. If it is desired to increase the resilient force with which the operating shaft is held in any particular angular position, a supplementary spring 20 may be provided which operates between the head portion 13a of the operating shaft and the base portion 10b of the frame.

To effect the selective angular shifting of the operating shaft 13 from its neutral to either of its turn-indicating positions, an actuator member 21 is provided which is of generally U-shaped configuration. One arm 21a of the actuator member 21 is co-rotatably secured to the head portion 13a of the shaft 13 in any suitable manner. The other arm 21b of the actuator member 21 is journaled in the bearing aperture 11c pierced in the cover plate 11. Such journaling may be accomplished in any convenient manner, such as by a pin 22 pressed into arm 21b and which has a reduced diameter shank portion 22a projecting into the bearing aperture 11c in cover 11. It is therefore apparent that any angular shifting of the actuator member will produce a corresponding annular shifting of the switch operating shaft 13.

To manually shift the actuator 21, a tubular operating handle 23 is provided which is rigidly secured to a bight portion 21c of the U-shaped actuator 21. Such securement may be effected by an externally threaded sleeve 22 which is pressed over the end of the tubular operating handle 23.

The free end of the operating handle 23 has a socket sleeve 24 brazed thereto. Socket sleeve 24 is of larger diameter than handle 23, and thus defines a shoulder 24a for the seating thereon of a contact spring 19. Bayonet slots 24b are formed in the end of socket sleeve 24 and are suitablly shaped so as to provide the customary socket mounting for an automobile type lamp 25, the lamp 25 having pin-like projections 25a on its base portion cooperating with the bayonet slots 24b in conventional fashion.

To effect the energization of the lamp 25, a metallic contact stud 26 of rivet-like configuration is insulatably mounted adjacent the secured end of the operating handle 23 by insertion in a sleeve 27 of insulating material which, in turn, is inserted in the inner end of the mounting sleeve 22. An insulated conductor 28 passes through the hollow bore of the tubular operating handle 23 and is secured at one end to the contact stud 26 and at the other end is electrically and mechanically secured to a contact disk 29 which is axially slidable within the bore of the socket sleeve 24. The spring 19 then acts on contact disk 29 to urge the contact disk into snug engagement with the conventional center contact 25b of the lamp 25, and, concurrently, through the insulated conductor 28, holds the contact stud 26 and insulating sleeve 27 in assembly in the mounting sleeve 22.

As will be later described, the lamp 25 is selectively energized to indicate the operating condition of the turn-signalling system. To protect lamp 25 from injury due to inadvertent contacts by the operator, as well as to enhance the overall appearance of the operating handle 23, a translucent cover 45 is provided which is suitably shaped to surround the free end of the operating handle 23 and completely enclose the indicating lamp 25. Due to the translucent nature of the cover 45, the indications of lamp 25 will nevertheless be readily visible. Cover 45 may be mounted on the operating handle 23 in any convenient manner, such as by being threaded upon a bushing 46 which, in turn, is snugly fitted over the free end portions of the handle 23. Preferably, the external translucent contour of the cover 45, in conjunction with that of the bushing 46, is so arranged as to form a convenient handle for grasping by the fingers or hand of the operator of the vehicle.

Any suitable means may be provided for connecting the contact stud 26 to the appropriate terminals of the electric switch unit 12. For example, a leaf spring contact 31 may be insulatably mounted on the bottom arm 21a of the actuator 21 as by rivet 32, insulating bushing 33 and insulating washer 33a.

The same bottom arm of the actuator member may be employed to conveniently mount the steering shaft actuated resetting mechanism. Such mechanism may comprise any of several well known forms and is here shown as constituting a pair of dogs 35 which are respectively pivotally mounted adjacent opposite edges of the arm portion 21a by rivets 36. Each dog 35 has a roller 37 journaled on its outer end and a common spring 38 operates between the two dogs 35 to normally maintain them in abutting engagement with upstanding integral ears 21d formed on the bottom arm 21.

When the frame 10 is assembled adjacent the steering shaft (not shown) of an automotive vehicle, a cam or projection (not shown) which is co-rotatable with the steering shaft of the vehicle cooperates with the detents 35 to effect the resetting of the actuator 21, and hence the electric switch mechanism, to a neutral position upon the completion of any indicated turn. When the switch-operating shaft 13 is in neutral position, the dogs 35 are disposed as indicated in Figures 1 and 3, and in this position the projecting end of each dog which carries the roller 37 is disposed out of the path of the cam or projection carried by the steering shaft. However, when the switch-operating shaft 13 is shifted by handle 23 from its neutral position to either the right-hand turn-indicating position, which might, for example, be the position shown in Figure 4, or to its left-hand turn-indicating position, as illustrated in Figure 5, then one of the dogs 35 will be angularly shifted sufficiently to bring its roller 37 into the path of rotational movement of the cam or projection carried by the steering shaft. The dogs 35 will be merely cammed out of the path of the steering shaft cam or projection during the initial movement of the steering shaft incident to accomplishing the indicated turn. However, upon the return movement of the steering shaft and the re-engagement of the steering shaft cam or projection with the particular dog 35, the dog 35 will be forced against the stop projection 21d formed on the actuator 21. Hence, the steering shaft carried cam or projection will produce an angular displacement of the actuator 21 back to the neutral position. Such operation of the resetting mechanism is entirely conventional as well known and hence it would seem unnecessary to describe such in further detail.

Referring to the circuit diagram of Figure 6, it will be assumed that the particular switch unit 12 employs six fixed contact rivets indicated respectively at 16a through 16f. Two adjacent fixed contacts 16a and 16b are interconnected by a terminal strip 39 and are connected to the hot side of the car battery B. Likewise, the opposite two adjacent fixed contacts 16d and 16e are interconnected by a suitable conductor, such as a terminal strip 40, and the terminal strip 40 is then connected by a suitable conductor 41 to the spring arm contact 31 which will be recalled to be in the energization circuit of the lamp 25. The remaining two fixed contacts 16c and 16f are respectively connected to the right-hand and left-hand turn-indicating lamps 43 and 44. While only one lamp is shown for one direction of indication, it is perfectly obvious that a plurality of such lamps may be employed, such as separate lamps at both the front and rear of the vehicle. However, all of the right-hand turn-indicating lamps are connected in parallel between the fixed contact 16c of the switch 12 and ground, and all of the left-hand turn-indicating lamps are likewise connected in parallel between the opposite fixed contact 16f of the switch and ground.

With the aforedescribed arrangement, it is apparent that due to the triangular disposition of the contact embosses 18 which are mounted in the vertices of the triangular contact plate 17 there will be one position, as indicated schematically in Figure 6, wherein none of the contact embosses 18 of the triangular contact plate 17 are in engagement with any of the fixed contact rivets 16, and this position is the neutral or non-indicating position. Upon manipulation of the operating handle 23 in a clockwise direction from the neutral position one step, the turn-indicating lamp 43 will be energized, and, concurrently, the lamp 25 which is carried by the operating handle 23 will be energized. Upon movement of the operating shaft 13 in a counter-clockwise direction from the neutral position, the other turn-indicating lamp 44 will be energized, and, concurrently, the operating handle position indicating lamp 25 will again be energized.

It is therefore apparent that the selective energization of the lamp 25 as function of the position of the operating handle 23 provides a very convenient visual indication of the condition of the directional current signalling system. The operator of the vehicle may be apprised by a glance at the lamp 25 in the end of the operating handle 23 that his indicating system is producing a signal. Of course, after an indicated turn has been completed, the system is returned to the neutral or non-indicating position by cooperation of the steering shaft or projection (not shown) with the reset detents 35 in the manner heretofore described.

From the foregoing description it is apparent that this invention provides a vehicle turn-indicating switch actuating mechanism of unusually simplified and economically manufacturable structure. The utilization of a U-shaped actuator member permits the adaptation of commercially available electric switch to this particular application, and hence eliminates the necessity for designing and producing a new switch for use in such application. Furthermore, the employment of an indicating lamp in the end of the operating handle of the switch mechanism, taken in conjunction with the selective energization of such lamp as a function of the operating condition of the mechanism, provides an unusually simplified yet effective manner of indicating to the operator of the vehicle the exact condition of his turn-indicating signalling system. At the same time all of the foregoing improvements are effected without in any manner diminishing the effectiveness of the turn-indication produced by the system, or the resetting thereof following the completion of an indicated turn.

It will, of course, be understood that various details of construction may be modified through a wide range without departing from the principles of this invention, and it is, therefore, not the purpose to limit the patent granted hereon other than specified in the appended claims.

We claim as our invention:

1. In a vehicle turn-indicator switch of the type having an operating post rotatably mounted for switch adjustment, the improvement of a tubular lever arm having one end thereof secured to the operating post for controlling the switch, said lever arm being selectively angularly shiftable between a neutral and a turn-indicating position to pivotally displace the operating post, socket means at the free end of said lever arm adapted to support a light bulb, a translucent cover secured to the free end of said lever arm to enclose the light bulb, said cover being shaped to provide a hand grip for said lever arm, and connecting means for energizing said light bulb carried at the secured end of said lever arm to energize said light bulb when said lever arm and said operating post are shifted to said turn-indicating position.

2. In a vehicle turn-indicator switch having a frame adapted for mounting adjacent the steering shaft of an automotive vehicle and supporting an electric switch having stationary elements secured to said frame and a rotatable operating shaft, the improvement of an actuator adapted to be journaled in the frame and adapted to be co-rotatably secured to said operating shaft to pivotally displace said shaft between a neutral and a turn-indicating position, a tubular lever arm secured to said actuator and extending radially outwardly therefrom, an electric light in the free end of said lever arm, a first contact insulatably mounted in the secured end of said lever arm, and a leaf spring contact member connecting the switch and said first contact to complete an energization circuit to said light bulb to energize said light bulb whenever said lever arm is shifted from a neutral to a turn-indicating position.

3. In a vehicle turn indicating switch of the type including a frame having an electric switch therein and having a switch operating shaft rotatably supported in said frame for movement between a neutral position and a turn indicating position, the improvement of a U-shaped actuator having one arm adapted to be co-rotatably secured to said operating shaft and the other arm adapted to be rotatably supported by said frame, a lever arm forming a manual operating handle and secured to the bight portion of said actuating member, said lever arm extending radially outwardly from said actuator to pivotally drive said actuator in selected angular direction, a pair of pivotally mounted arms with rollers on the free ends thereof and being carried on one arm of said actuating member, said arms having a resilient link connection therebetween, means to limit the pivotal movement of said arms, an electric light in the end of said lever arm, and circuit means between said switch and said light to energize said light whenever said lever arm actuates said switch to a turn-indicating position.

4. An apparatus according to claim 3 in which said circuit means include a first contact insulatably mounted in the secured end of said lever arm and a leaf spring contact member insulatably mounted on said U-shaped actuator and cooperating with said first contact to complete an energization circuit to said light.

5. In a vehicle turn-indicating switch of the type having a frame housing an electric switch and including a switch operating shaft rotatably supported in said frame for movement between a neutral position and turn-indicating position, the improvement of a U-shaped actuator having one arm adapted to be co-rotatably secured to said operating shaft and the other arm adapted to be rotatably supported by said frame, a radially outwardly extending lever arm secured to the bight portion of said actuator and forming an operating handle to pivotally displace said actuator in selected angular direction, a light source in the free end of said lever arm, a translucent cover on the free end of said lever arm to enclose said light source and forming a manual grip on the end of said lever arm, and circuit means including a contact member carried on the secured end of said lever arm for selectively energizing said light source whenever said lever arm is angularly shifted from a neutral to a turn-indicating position.

6. In a vehicle turn-indicating switch of the type adapted for mounting adjacent the steering shaft of an automotive vehicle and cooperable with actuating means carried thereby, a frame having spaced walls apertured to provide a pair of coaxial bearings, an electric switch, said electric switch having stationary elements thereof secured to said frame and a rotatable operating shaft journaled in one bearing aperture of said frame, a U-shaped actuator having one arm co-rotatably secured to said operating shaft and the other arm pivotally journaled in said other bearing aperture on said frame, a manual operating handle secured to the bight portion of said actuating member, whereby said switch-operating shaft may be selectively rotated in either direction from a neutral position upon the manipulation of said operating handle, steering shaft actuatable reset means comprising a pair of pivotally mounted arms with rollers on the free ends thereof and carried on one arm portion of said actuating member, said arms being yieldably joined by a resilient member, and upstanding integral ears on the actuators to limit the pivotal movement of the reset means, whereby the steering shaft actuating means together with the reset means will automatically return the switch to neutral position upon the completion of a turn.

THOMAS W. DRURY.
NELSON H. WEBER.
EUGENE F. LORO.

REFERENCES CITED

The following references are of record in the file of this patent:

UNITED STATES PATENTS

| Number | Name | Date |
|---|---|---|
| 251,553 | Edison | Dec. 27, 1881 |
| 1,465,596 | Collins et al. | Aug. 21, 1923 |
| 1,690,370 | Hoeller | Nov. 6, 1928 |
| 1,713,305 | Stonehill | May 14, 1929 |
| 2,040,923 | Doane | May 19, 1936 |
| 2,215,229 | Pybus | Sept. 17, 1940 |
| 2,248,760 | Kirby | July 8, 1941 |
| 2,262,170 | Douglas | Nov. 11, 1941 |
| 2,276,411 | Moore | Mar. 17, 1942 |
| 2,284,936 | Wilshusen | June 2, 1942 |
| 2,305,132 | Bradford | Dec. 15, 1942 |
| 2,308,108 | Roedding | Jan. 12, 1943 |
| 2,428,447 | Bolley | Oct. 7, 1947 |
| 2,449,486 | Killian et al. | Sept. 14, 1948 |

FOREIGN PATENTS

| Number | Country | Date |
|---|---|---|
| 677,960 | France | Dec. 19, 1929 |